(12) United States Patent
Wang

(10) Patent No.: US 8,866,447 B2
(45) Date of Patent: Oct. 21, 2014

(54) UNINTERRUPTIBLE POWER SUPPLY HAVING EFFICIENT POWER CONVERSION

(75) Inventor: Jian Wang, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 397 days.

(21) Appl. No.: 13/325,729

(22) Filed: Dec. 14, 2011

(65) Prior Publication Data

US 2013/0154545 A1    Jun. 20, 2013

(51) Int. Cl.
| H02J 7/04 | (2006.01) |
| H02J 7/00 | (2006.01) |
| H02J 3/32 | (2006.01) |
| H02J 7/02 | (2006.01) |

(52) U.S. Cl.
USPC .............. 320/140; 307/66; 307/46; 307/82; 320/107; 320/111

(58) Field of Classification Search
USPC .............. 320/140, 107, 111; 307/46, 66, 82
See application file for complete search history.

(56) References Cited

U.S. PATENT DOCUMENTS

| 4,860,185 | A | * | 8/1989 | Brewer et al. ................... 363/41 |
| 4,977,351 | A | * | 12/1990 | Bavaro et al. ................... 315/87 |
| 5,982,645 | A | * | 11/1999 | Levran et al. ................... 363/37 |
| 6,311,279 | B1 | * | 10/2001 | Nguyen ........................ 713/300 |
| 6,548,986 | B1 | * | 4/2003 | Jakubowski ................... 320/111 |
| 7,352,083 | B2 | * | 4/2008 | Nielsen et al. .................. 307/66 |
| 8,080,900 | B2 | * | 12/2011 | Corhodzic et al. .............. 307/66 |
| 8,253,373 | B2 | * | 8/2012 | Manor et al. ................... 320/107 |
| 8,624,433 | B2 | * | 1/2014 | Whitted et al. ................. 307/66 |
| 8,653,696 | B2 | * | 2/2014 | King et al. ..................... 307/82 |
| 2008/0231233 | A1 | * | 9/2008 | Thornton ....................... 320/137 |
| 2011/0121654 | A1 | * | 5/2011 | Recker et al. .................. 307/66 |
| 2011/0291611 | A1 | * | 12/2011 | Manor .......................... 320/107 |
| 2012/0069606 | A1 | * | 3/2012 | Sagneri et al. ............. 363/21.02 |

* cited by examiner

Primary Examiner — M'Baye Diao
(74) Attorney, Agent, or Firm — Rabin & Berdo, P.C.

(57) ABSTRACT

An uninterruptible power supply having efficiency power conversion has an AC to DC power conversion circuit, a battery power conversion circuit and a control circuit. The AC to DC power conversion circuit is parallelly connected to the battery power conversion circuit to convert the AC power of an AC mains into a DC power and supply the DC power to a load. When the AC mains stably supplies power, the control circuit controls to activate the AC to DC power conversion circuit and supply power to the load through the AC to DC power conversion circuit only. As there is only one power conversion between the AC mains and the load, the power conversion efficiency can be enhanced.

2 Claims, 15 Drawing Sheets

UNINTERRUPTIBLE POWER SUPPLY HAVING EFFICIENT POWER CONVERSION

BACKGROUND OF THE INVENTION

1. Field of the Invention

The present invention relates to an uninterruptible power supply (UPS), and more particularly to a UPS having efficient power conversion.

2. Description of the Related Art

With reference to FIG. 7, a conventional UPS has an AC to DC conversion and charging circuit 60, a first DC conversion circuit 61, a second DC conversion circuit 62, a battery circuit 63 and a control circuit 64.

The AC to DC conversion and charging circuit 60 has a set of input terminals and a set of output terminals, and the set of input terminals is connected to an AC mains 65 to lower voltage of the AC power and convert the AC power into a DC power. The AC to DC conversion and charging circuit 60 has a low frequency transformer to lower voltage of the AC power.

The first DC conversion circuit 61 has a set of input terminals and a set of output terminals, and the set of input terminals is connected to the set of output terminals of the AC to DC conversion and charging circuit 60 to receive the converted DC power and lower the DC power with a voltage level, such as tens of volts, to that with another voltage level, such as 12 volts, so as to supply power to a first load 66.

The second DC conversion circuit 62 has a set of input terminals and a set of output terminals, and the set of input terminals is connected to the set of output terminals of the first DC conversion circuit 61 to further lower power outputted from the first DC conversion circuit 61 to that with different voltage level, such as a voltage drop from 12 volts to 5 volts, so as to supply power to a second load 67 with different power requirement. Hence, the first DC conversion circuit 61 and the second DC conversion circuit 62 output power with different voltage levels and supply the power to loads with different power requirements.

The battery circuit 63 is parallelly connected between the AC to DC conversion and charging circuit 60 and the first DC conversion circuit 61, and has a switching element 631, a diode 630 and a rechargeable battery 632. The switching element 631 has a control terminal and may be a relay. The diode is parallelly connected with the switching element 631. The rechargeable battery 632 is serially connected to the parallelly connected diode 630 and switching element 631. The cathode of the diode 630 is connected to one terminal of the set of output terminals of the AC to DC conversion and charging circuit 60, and the anode of the diode 630 is connected to the anode of the rechargeable battery 632. The cathode of the rechargeable battery 632 is connected to the other terminal of the set of output terminals of the AC to DC conversion and charging circuit 60.

The control circuit 64 is connected to the AC to DC conversion and charging circuit 60 and the control terminal of the switching element 631.

Given the foregoing circuit design, despite a power failure of the AC mains 65, the rechargeable battery 632 can still supply power to the first and second loads 66, 67 through the diode 630, thereby preventing the first and second loads 66, 67 from losing power.

To avoid a low power storage capacity of the rechargeable battery 632 failing to supply sufficient power at power outage, the control circuit 64 can monitor the power storage capacity of the rechargeable battery 632. If the power storage capacity of the rechargeable battery is detected to be lower than a preset value, it indicates that the power storage capacity of the rechargeable battery is low. The control circuit 64 then controls the switching element to be closed so that the DC power outputted by the AC to DC conversion and charging circuit 60 is not only outputted to the first DC conversion circuit 61 but also charges the rechargeable battery 632. If the power storage capacity of the rechargeable battery 632 is higher than the preset value, it indicates that the power storage capacity of the rechargeable battery 632 is almost saturated. The control circuit 64 then controls the switching element to be opened so as to stop charging the rechargeable battery 632. Hence, it is the control circuit 64 monitoring and controlling the rechargeable battery 632 on a real-time basis to ensure that the power storage capacity of the rechargeable battery is sufficient.

To sum up, the DC power received by the first and second loads 66, 67 is obtained by converting the mains power at least twice. In other words, the DC power received by the first and second loads 66, 67 at least passes through the AC to DC conversion and charging circuit 60 and the first DC conversion circuit 61. When the rechargeable battery 632 has a sufficient power storage capacity and is not required to be charged, the control circuit 64 controls the switching element to be opened so as to prevent the AC to DC conversion and charging circuit 60 from charging the rechargeable battery 632. As the input power of the first DC conversion circuit is still supplied by the AC to DC conversion and charging circuit 60, the additional stage of voltage conversion leads to worse power conversion efficiency. Moreover, a low-frequency transformer in the AC to DC conversion and charging circuit 60 further results in excitation loss. Under the foregoing circuit design, the AC to DC conversion and charging circuit 60 constantly performs DC voltage conversion and thus gives rise to more energy loss.

SUMMARY OF THE INVENTION

An objective of the present invention is to provide a UPS having efficient power conversion capable of reducing required numbers of voltage conversion when an AC mains stably supplies power to a load and achieving a higher power conversion efficiency.

To achieve the foregoing objective, the UPS having efficient power conversion has an AC to DC power conversion circuit, a battery power conversion circuit and a control circuit.

The AC to DC power conversion circuit has a set of input terminals and a set of output terminals. The set of input terminals is adapted to be connected to an AC mains.

The battery power conversion circuit is parallelly connected to the AC to DC power conversion circuit and has a charging circuit, a first DC conversion circuit and a rechargeable battery. The charging circuit has a set of input terminals and a set of output terminals. The set of input terminals is connected to the AC mains. The first DC conversion circuit has a set of input terminals and a set of output terminals. The set of input terminals is connected to the set of output terminals of the charging circuit. The set of output terminals is connected to the set of output terminals of the AC to DC power conversion circuit. The rechargeable battery is connected between the set of output terminals of the charging circuit and the set of input terminals of the first DC conversion circuit.

The control circuit is connected between the AC to DC power conversion circuit and the battery power conversion circuit and outputs a control signal to activate the first DC conversion circuit when the AC mains fails or unstably supplies power.

As the AC to DC power conversion circuit and the battery power conversion circuit are parallelly connected, the set of input terminals of the AC to DC power conversion circuit is connected to the AC mains and the set of output terminals is connected to a load, the control circuit controls to deactivate the battery power conversion circuit and the AC to DC power conversion circuit supplies DC power to the load only when the AC mains stably supplies power. When the AC mains fails or unstably supplies power, the control circuit then activates the first DC conversion circuit to output power to the load. Accordingly, when the AC mains stably supplies power, in comparison with conventional UPS, the UPS of the present invention effectively improves power conversion efficiency with single stage power conversion between the AC mains and the load.

Other objectives, advantages and novel features of the invention will become more apparent from the following detailed description when taken in conjunction with the accompanying drawings.

DETAILED DESCRIPTION OF THE INVENTION

Figure 1:
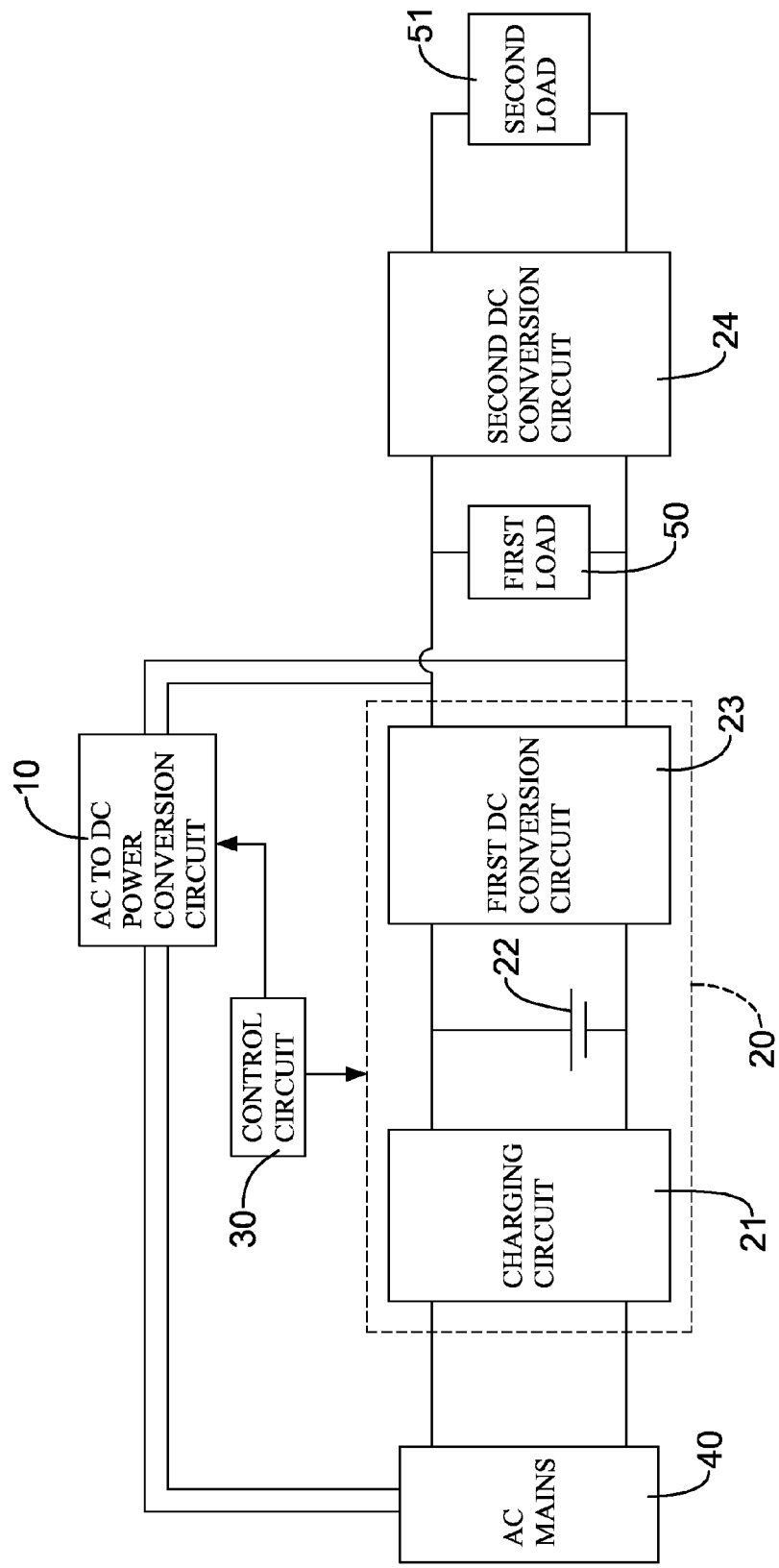
FIG. 1 is a functional block diagram of a UPS having efficient power conversion in accordance with the present invention.
Figure 2A:
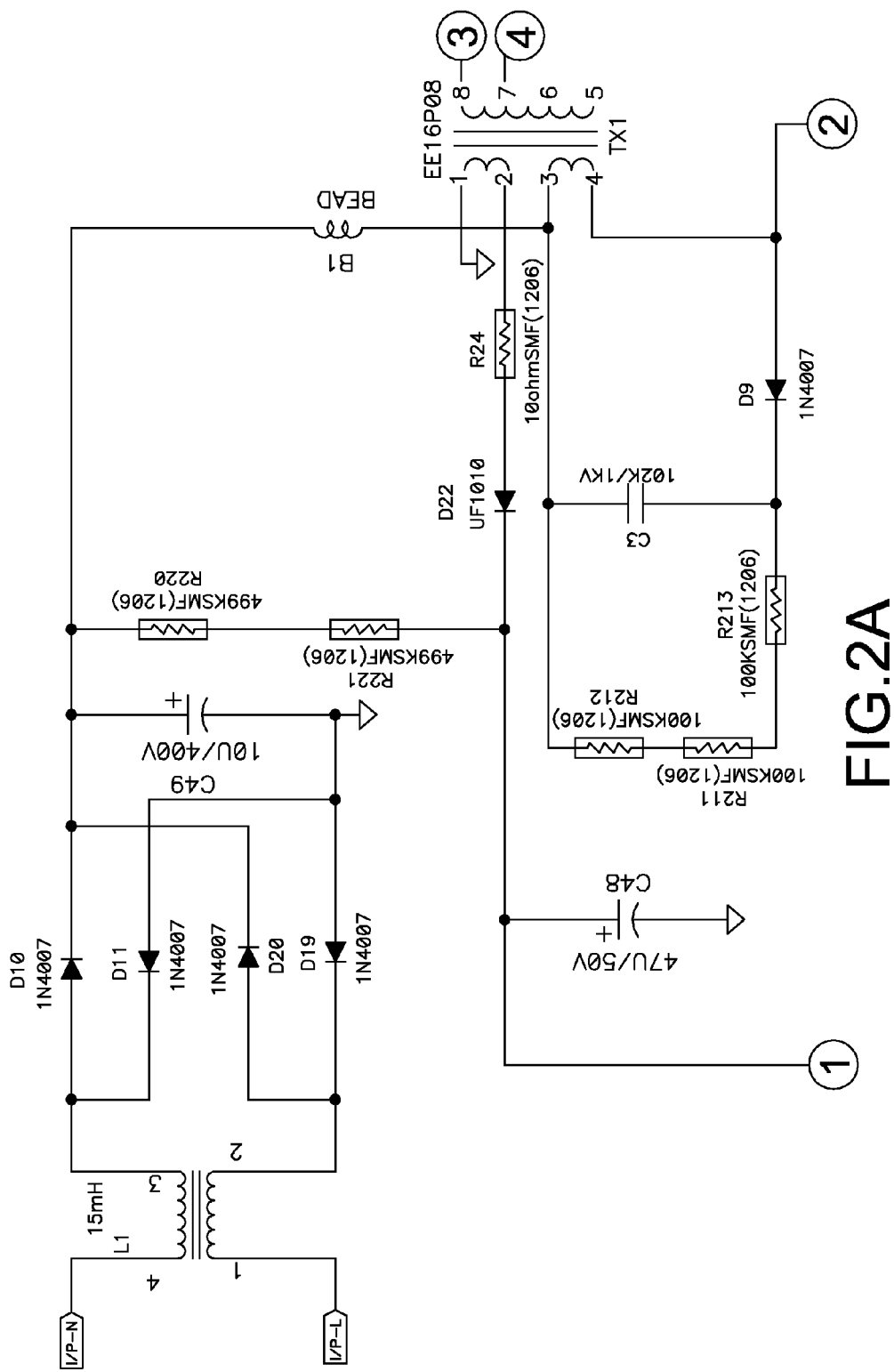
FIGS. 2A to 2D are divisions of a circuit diagram of an AC to DC power conversion circuit of the UPS in FIG. 1.
Figure 2B:
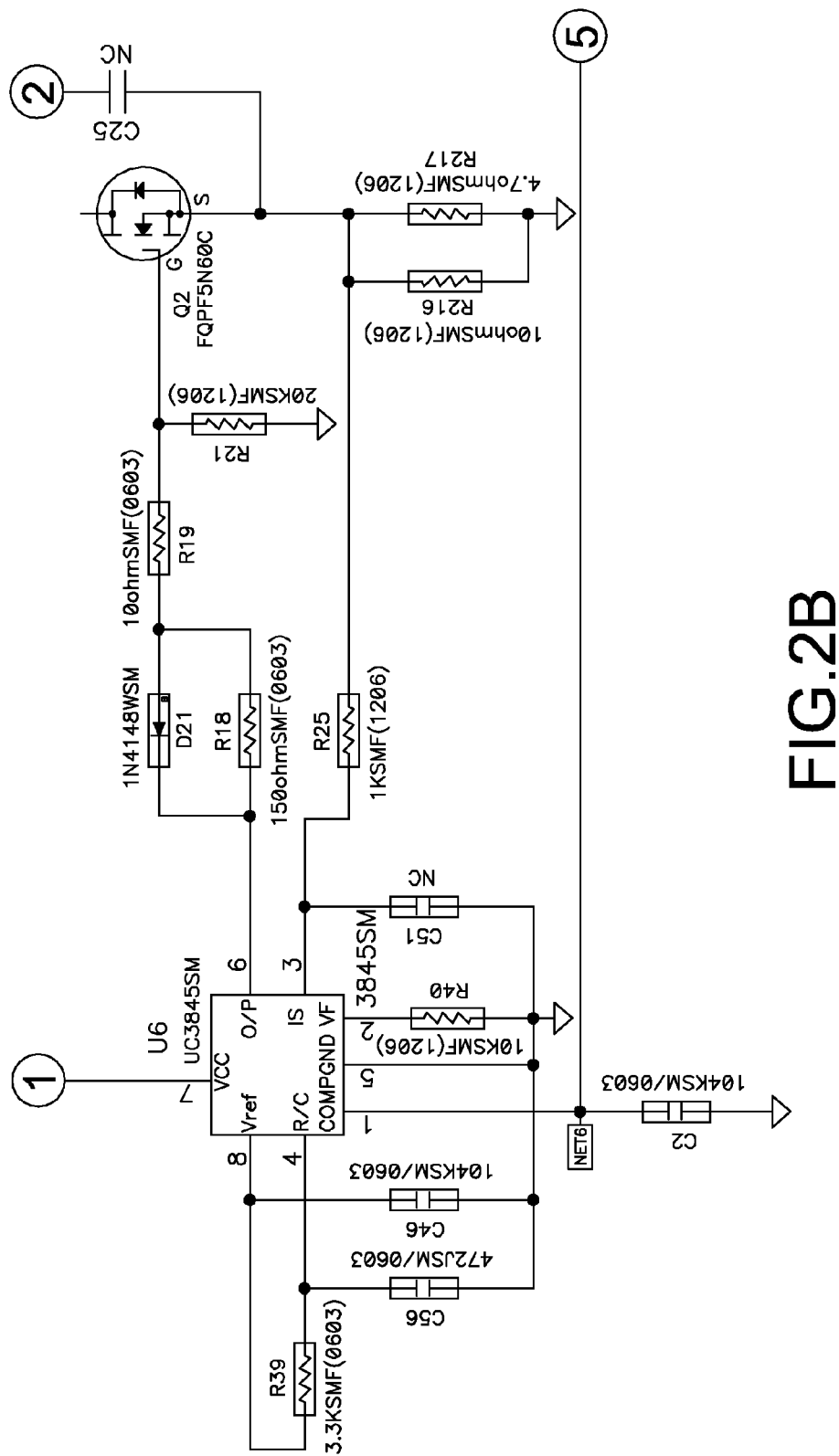
Figure 2C:
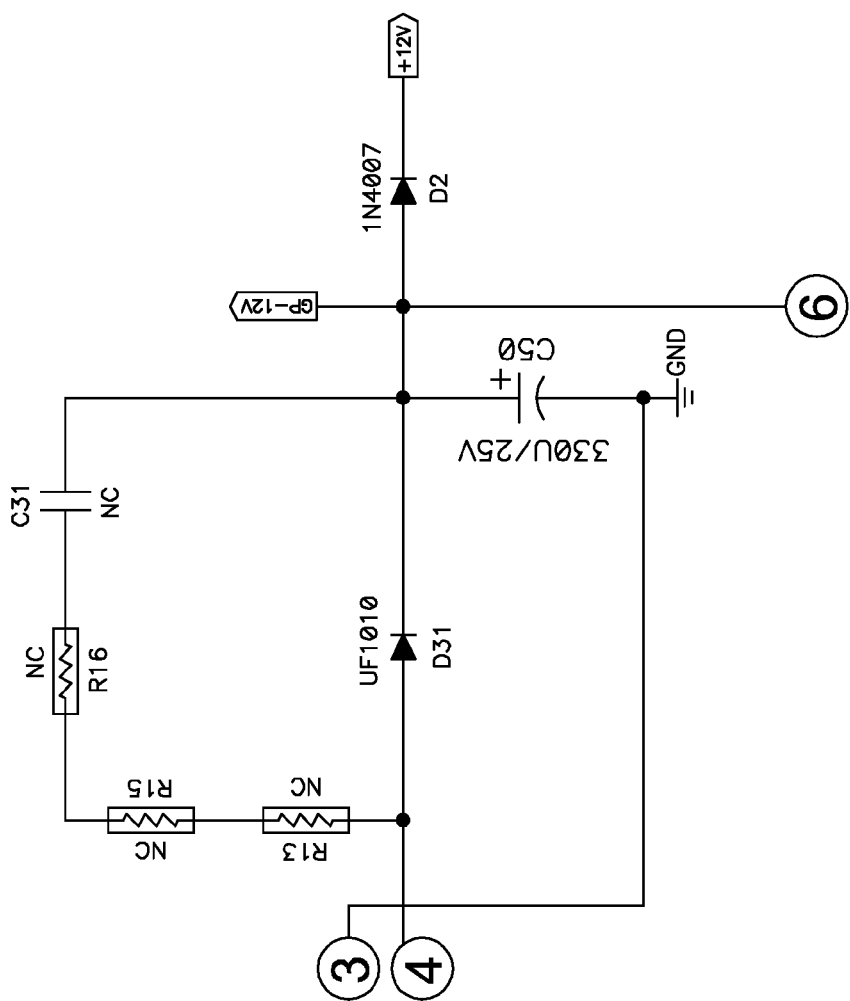
Figure 2D:
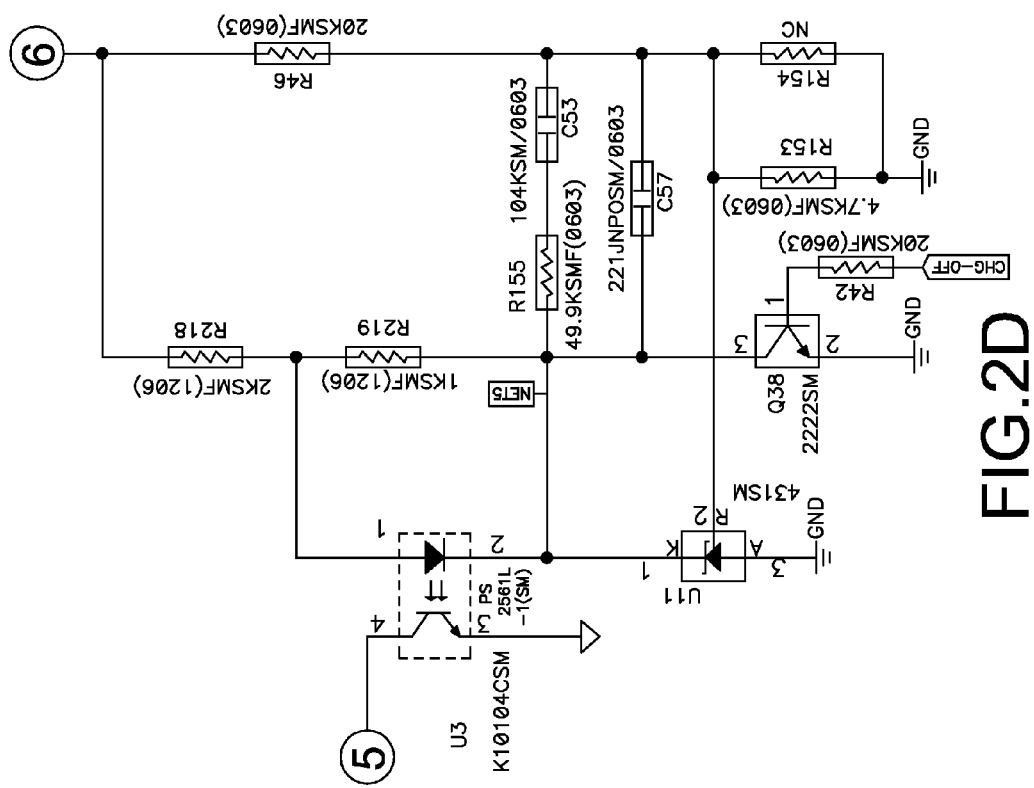
Figure 3A:
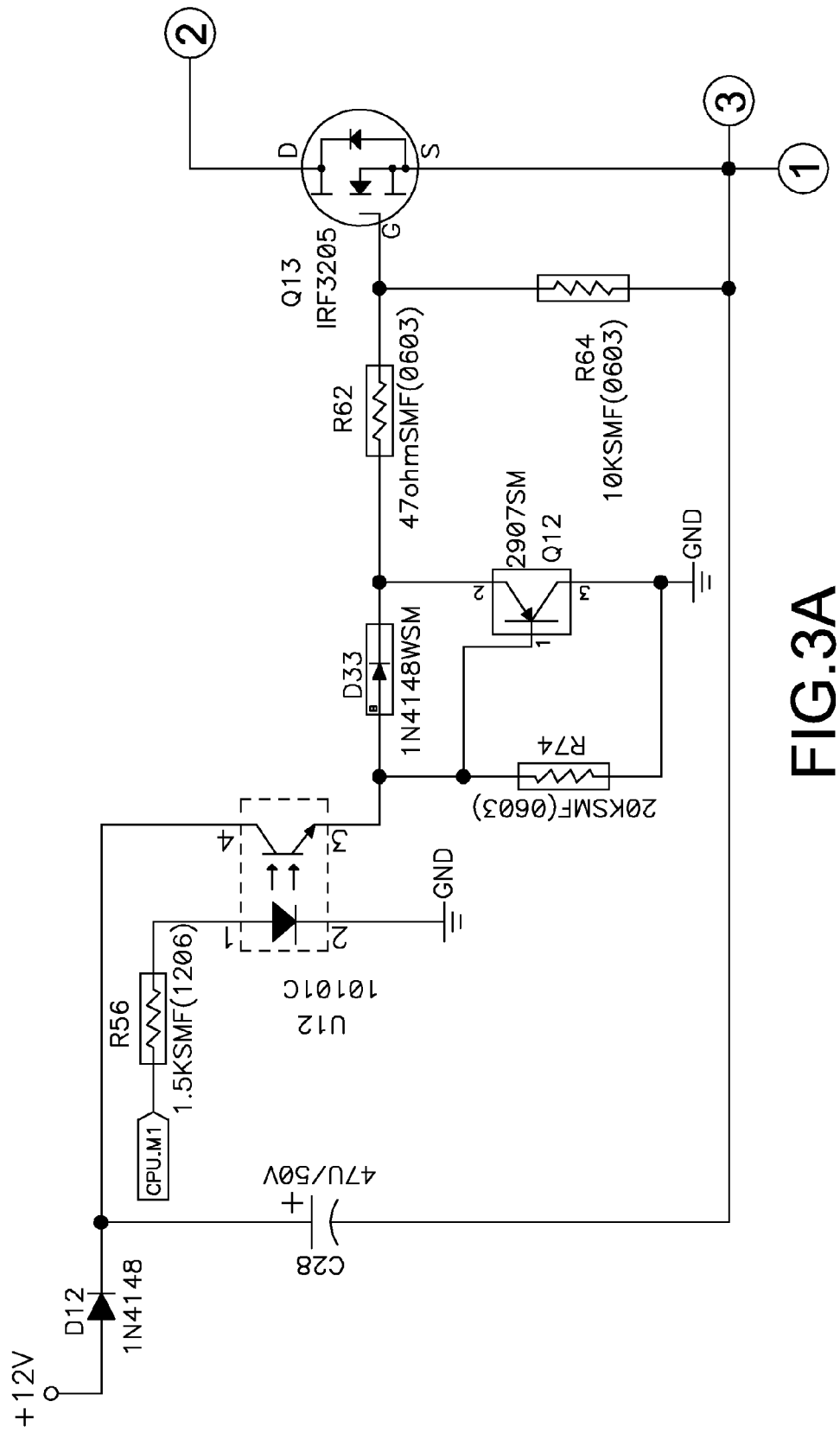
FIGS. 3A to 3C are divisions of a circuit diagram of a charging circuit of the UPS in FIG. 1.
Figure 3B:
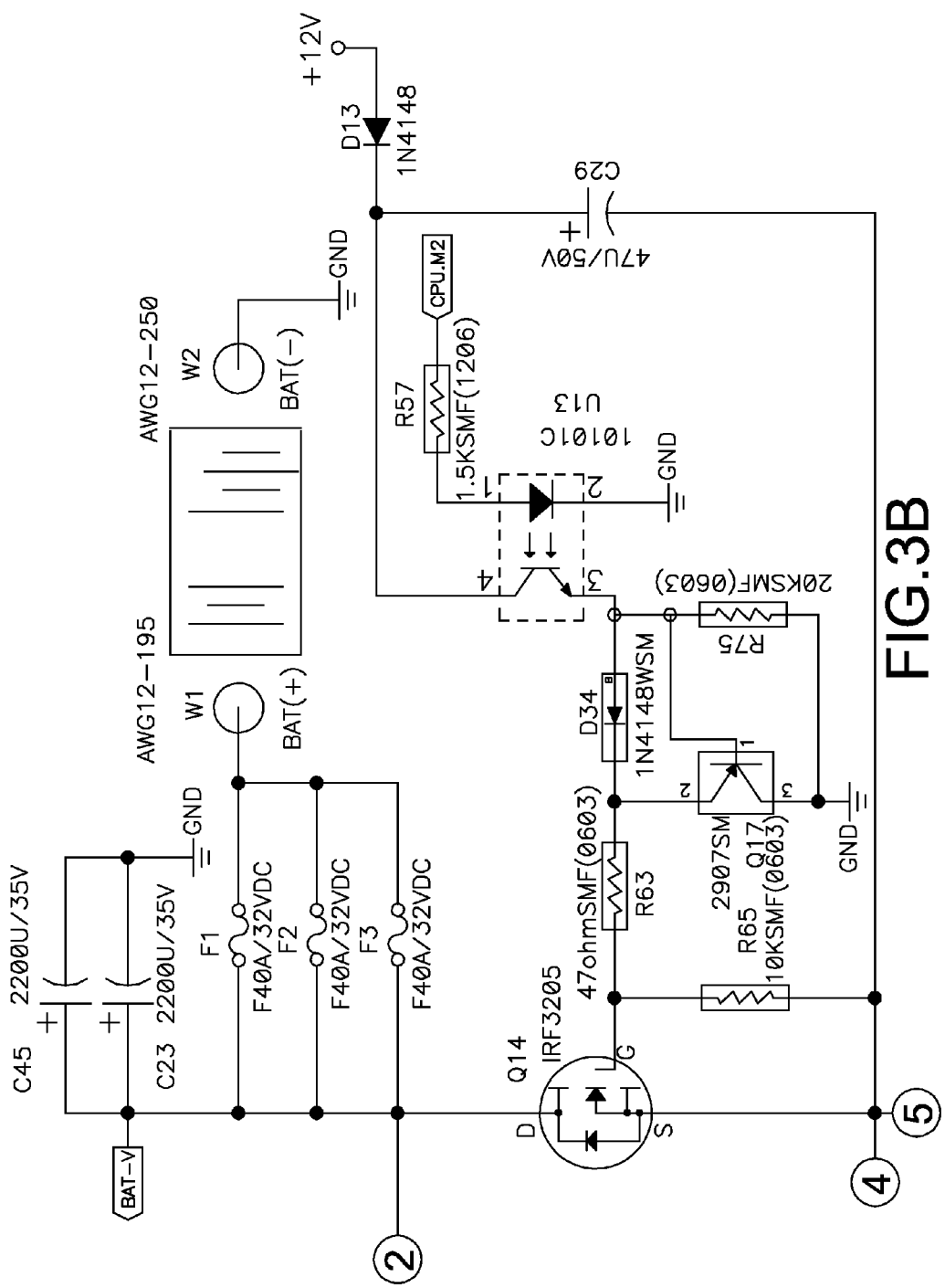
Figure 3C:
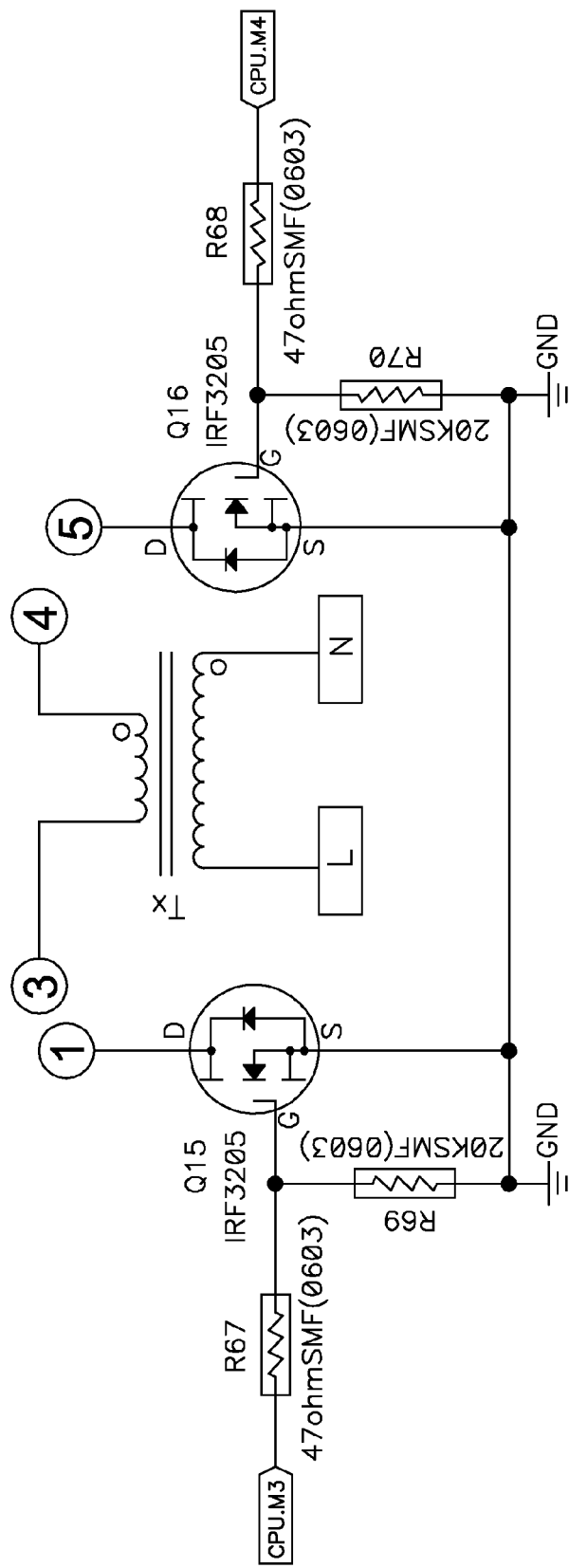
Figure 4:
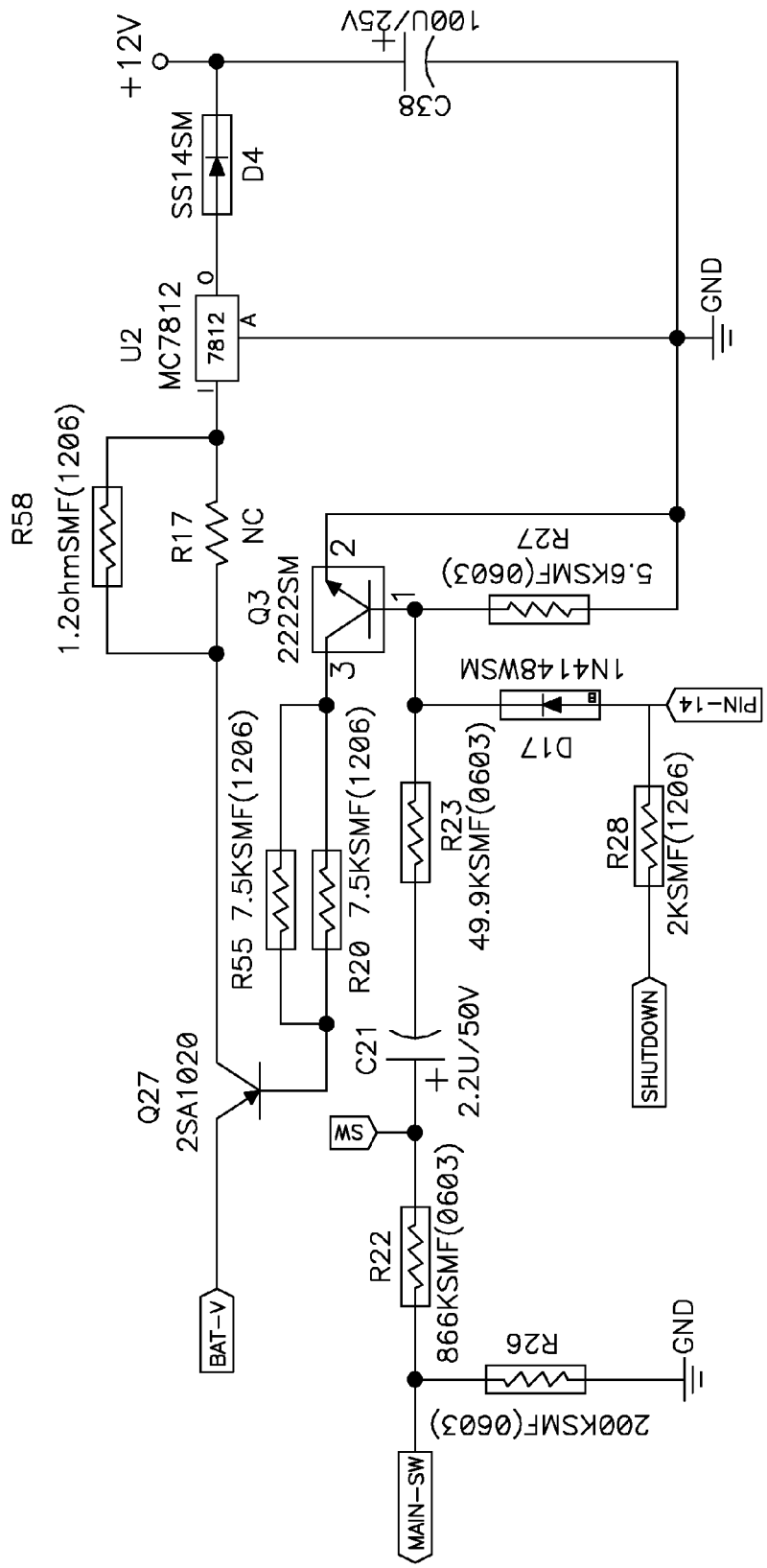
FIG. 4 is a circuit diagram of a first DC conversion circuit of the UPS in FIG. 1.

With reference to FIG. 1, a UPS having efficient power conversion in accordance with the present invention has an AC to DC power conversion circuit 10, a battery power conversion circuit 20 and a control circuit 30.

The AC to DC power conversion circuit 10 has a set of input terminals and a set of output terminals. The set of input terminals is connected to an AC mains 40, and the set of output terminals is connected to a first load 50 to convert the mains power into DC power, such as 12V DC power, and supply the DC power to the first load 50. With reference to FIGS. 2A to 2D, a detailed circuit diagram of the AC to DC power conversion circuit 10 is shown.

The battery power conversion circuit 20 is parallelly connected to the AC to DC power conversion circuit 10. A set of input terminals of the battery power conversion circuit 20 is connected to the AC mains 40, and a set of output terminals is connected to the first load 50. The battery power conversion circuit 20 further has a charging circuit 21, a rechargeable battery 22 and a first DC conversion circuit 23. The charging circuit 21 has a low-frequency transformer and a set of input terminals of the charging circuit 21 is connected to the AC mains 40. A set of input terminals of the first DC conversion circuit 23 is connected to the set of output terminals of the charging circuit 21, and a set of output terminals of the first DC conversion circuit 23 is connected to the set of output terminals of the AC to DC power conversion circuit 10 and the first load 50. The first DC conversion circuit 23 converts an output voltage of the charging circuit 21 into a voltage capable of supplying an operating power to the first load 50. The rechargeable battery 22 is connected between the set of output terminals of the charging circuit 21 and the set of input terminals of the first DC conversion circuit 23. With reference to FIGS. 3A to 3C and 4, detailed circuit diagrams of the charging circuit 21 and the first DC conversion circuit 23 are shown.

Figure 5:
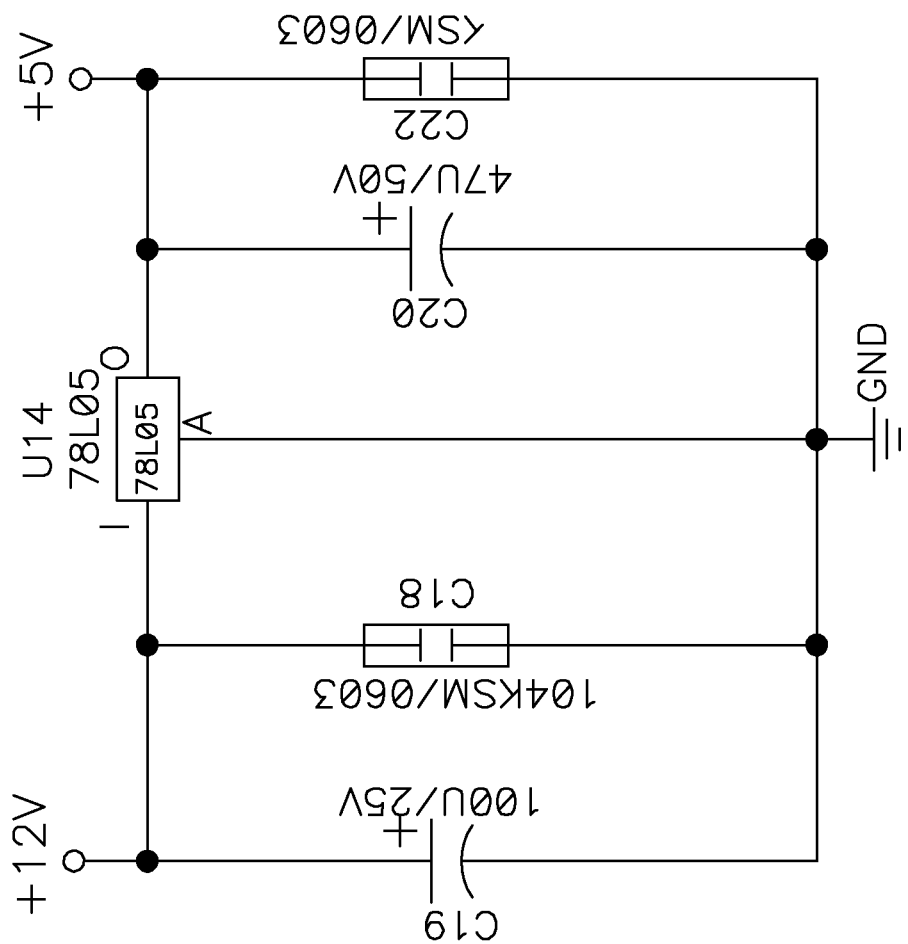
FIG. 5 is a circuit diagram of a second DC conversion circuit of the UPS in FIG. 1.
Figure 6A:
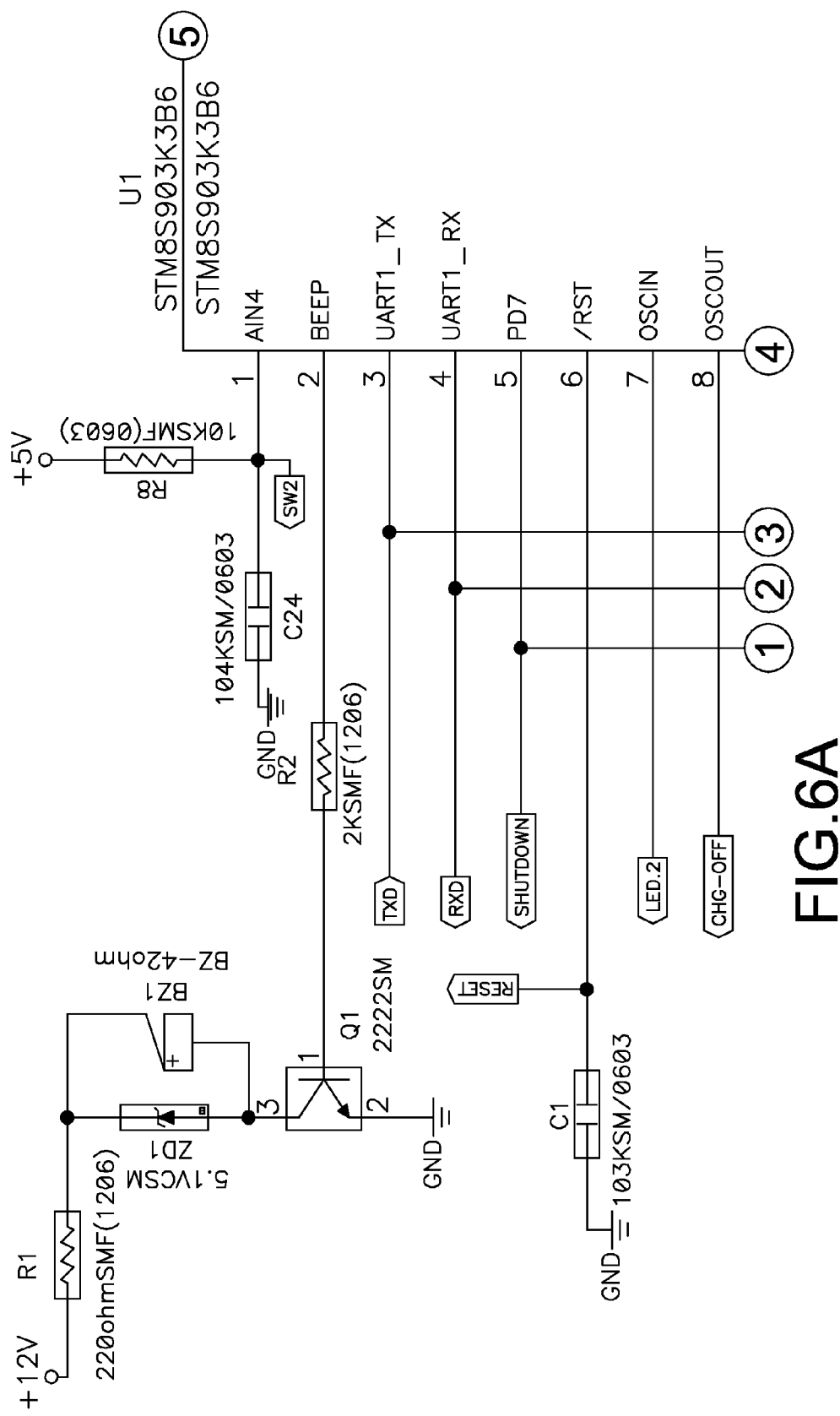
FIGS. 6A to 6D are divisions of a circuit diagram of a control circuit of the UPS in FIG. 1.
Figure 6B:
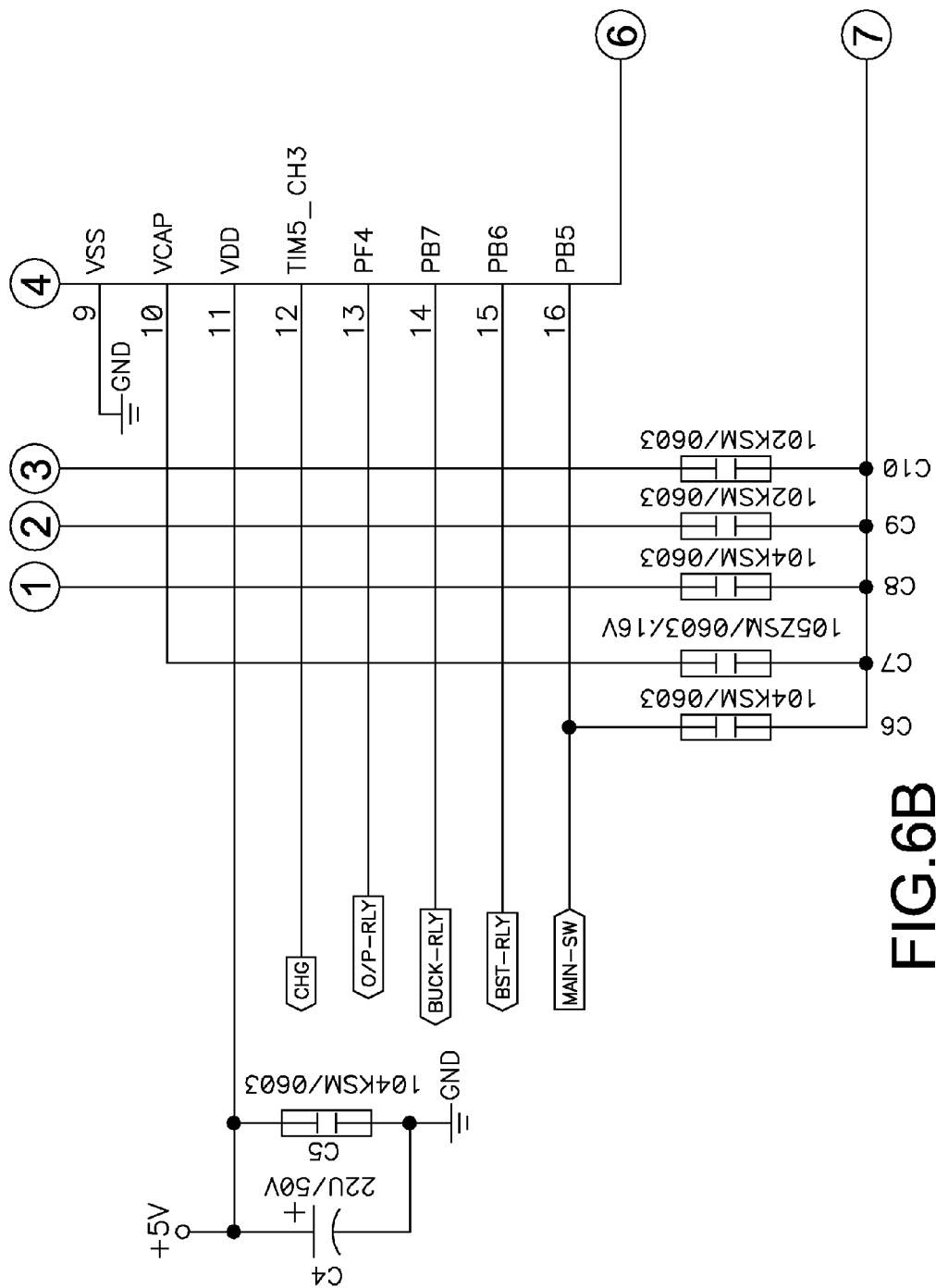
Figure 6C:
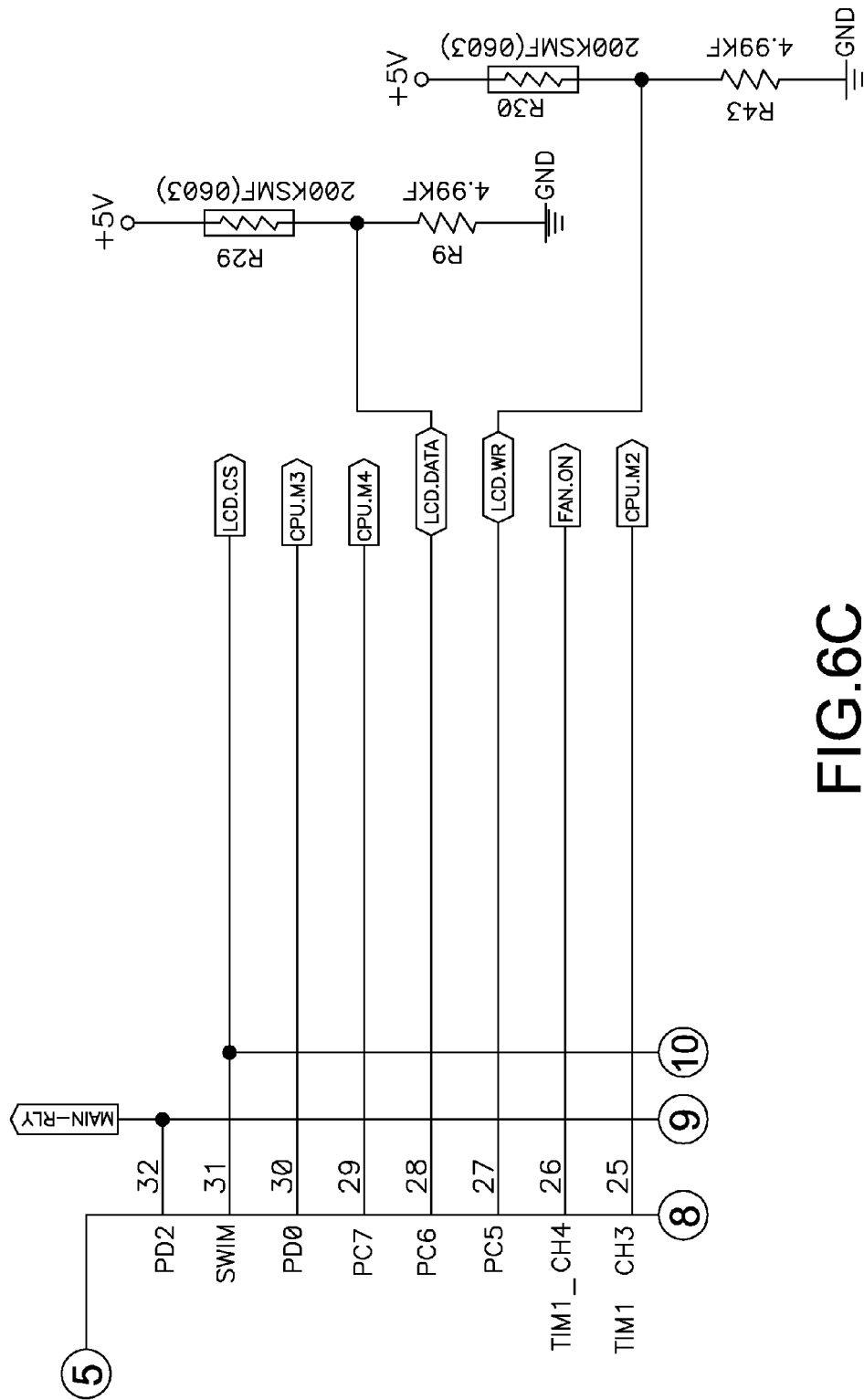
Figure 6D:
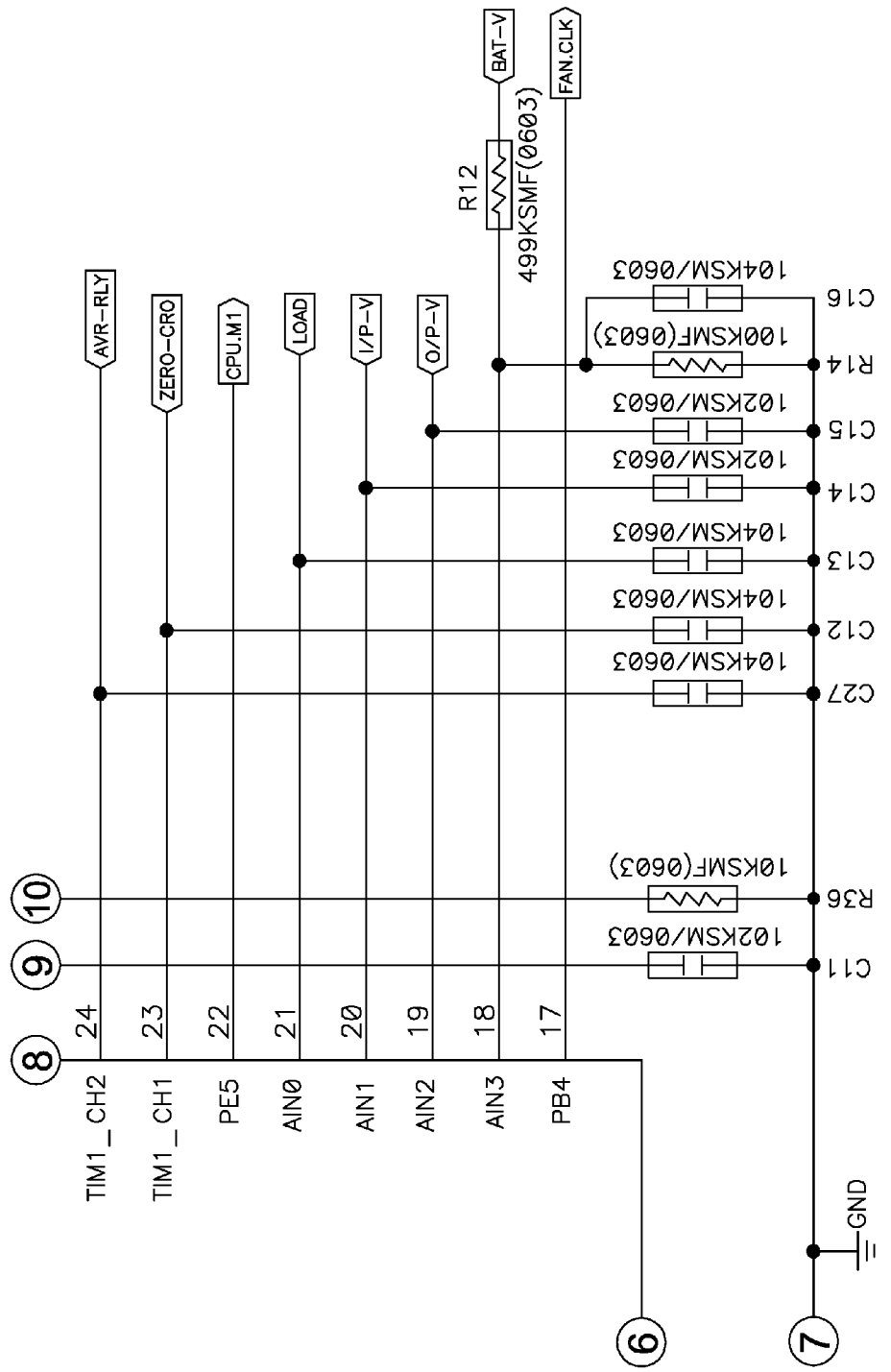
Figure 7:
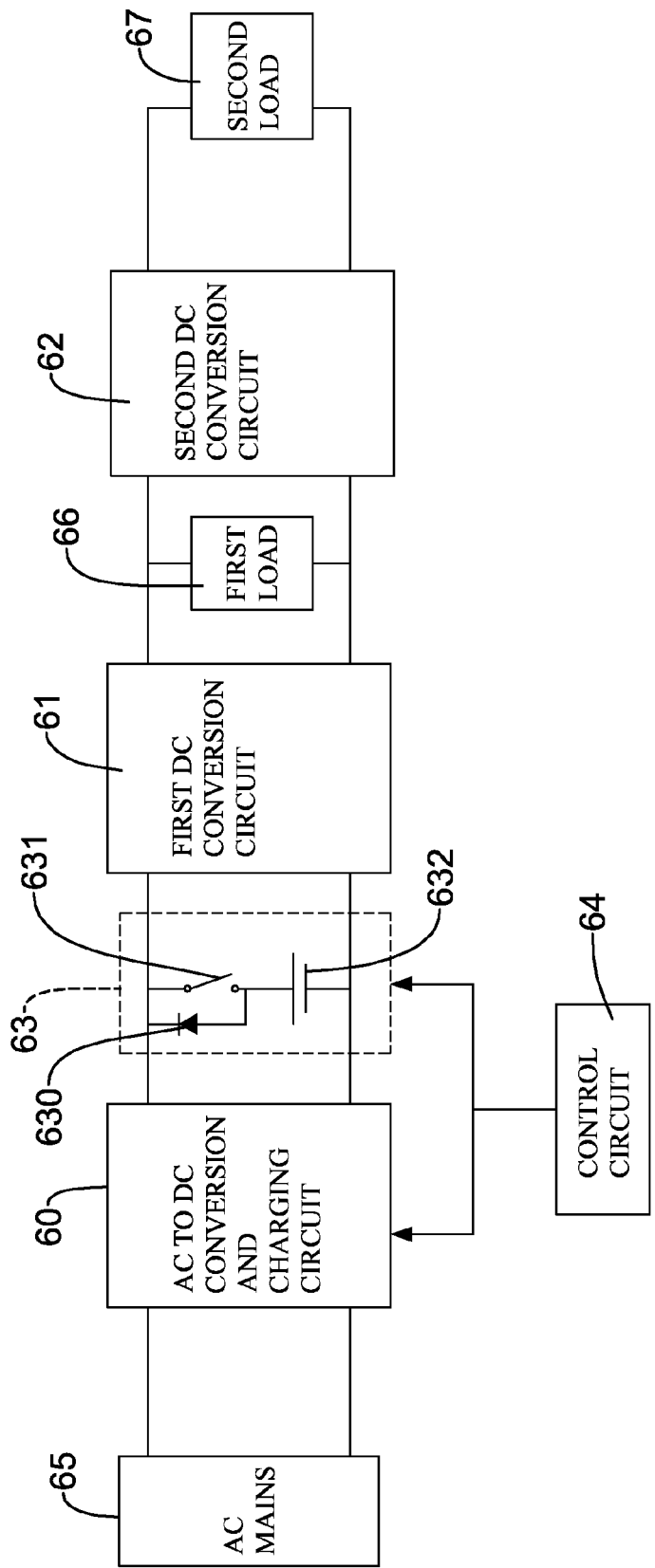
FIG. 7 is a functional block diagram of a conventional UPS.

The UPS having efficient power conversion further has a second DC conversion circuit 24. A set of input terminals of the second DC conversion circuit 24 is connected to the set of output terminals of the AC to DC power conversion circuit 10, and a set of output terminals thereof is connected to a second load 51 to output DC power converted by the second DC conversion circuit 24 and having a voltage level, such as 5V DC power, different from that of DC power outputted from the set of output terminals of the first DC conversion circuit 23 or the AC to DC power conversion circuit 10, so as to supply the converted DC power to the second load 51. With reference to FIG. 5, a detailed circuit diagram of the second DC conversion circuit 24 is shown.

The control circuit 30 is connected to the AC to DC power conversion circuit 10 and the battery power conversion circuit 20 to respectively activate or deactivate the AC to DC power conversion circuit 10, the charging circuit 21 and the first DC conversion circuit 23 and detect a power storage capacity of the rechargeable battery 22. The control circuit 30 can activate or deactivate the AC to DC power conversion circuit 10 or the battery power conversion circuit 20 based on a power supply state of the AC mains 40 during a specific time period. When the AC mains 40 stably supplies power, the control circuit 30 outputs a control signal to activate the AC to DC power conversion circuit 10 and deactivate the first DC conversion circuit 23 so that the AC to DC power conversion circuit can directly supply power to the first load 50. The specific time period is when the AC mains supplies power abnormally, such as power failure or unstable voltage. During the specific time period, the control circuit 30 outputs a control signal to deactivate the AC to DC power conversion circuit 10 and outputs a control signal to activate the first DC conversion circuit 23 so that the rechargeable battery 22 supplies power to the first DC conversion circuit 23, and then the first DC conversion circuit 23 converts the battery power to supply power to the first load 50.

With reference to FIGS. 6A to 6D, a detailed circuit diagram of the control circuit is shown. The control circuit 30 has an embedded algorithm to determine if a detected power storage capacity of the rechargeable battery 22 is lower than a preset value. If the detected power storage capacity of the rechargeable battery 22 is lower than the preset value, it indicates that the power storage capacity of the rechargeable battery 22 is low, and the control circuit 30 outputs a control signal to the charging circuit 21 to activate the charging circuit 21 so that the charging circuit 21 converts the mains power into DC power and supplies the converted power to the rechargeable battery 22. Otherwise, it indicates that the power storage capacity of the rechargeable battery 22 is sufficient, and the control circuit 30 outputs a control signal to the charging circuit 21 to deactivate the charging circuit 21. Meanwhile, as the first DC conversion circuit 23 is still deactivated, the rechargeable battery 22 is left idle.

When the AC mains 40 stably supplies power, the AC to DC power conversion circuit 10 directly converts the mains power into DC power and supplies the DC power to the first load 50 while the charging circuit 21 and the first DC conversion circuit 23 are deactivated. As there is only one-stage voltage conversion between the AC mains 40 and the first load 50, the UPS of the present invention can effectively raise power conversion efficiency in contrast to two-stage voltage conversions required by conventional UPS. Additionally, as the charging circuit 21 is deactivated, the low-frequency transformer therein is not activated, thereby avoiding unnecessary excitation loss arising from the operation of the low-frequency transformer and effectively reducing energy loss. Also, when the power storage capacity of the rechargeable battery 22 is sufficient, the control circuit 30 deactivates the charging circuit 21 so that the rechargeable battery 22 is left idle, thereby preventing the rechargeable battery 22 from being continuously charged when the power storage capacity of the rechargeable battery 22 is almost saturated, and prolonging the life duration of the rechargeable battery 22.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An uninterruptible power supply (UPS) having efficient power conversion comprising:
    an AC to DC power conversion circuit having:
        a set of input terminals adapted to be connected to an AC mains; and
        a set of output terminals;
    a battery power conversion circuit parallelly connected to the AC to DC power conversion circuit and having:
        a charging circuit having:
            a set of input terminals connected to the AC mains; and
            a set of output terminals;
        a first DC conversion circuit having:
            a set of input terminals connected to the set of output terminals of the charging circuit; and
            a set of output terminals connected to the set of output terminals of the AC to DC power conversion circuit; and
        a rechargeable battery connected between the set of output terminals of the charging circuit and the set of input terminals of the first DC conversion circuit; and
    a control circuit connected between the AC to DC power conversion circuit and the battery power conversion circuit and activating the first DC conversion circuit when the AC mains fails or unstably supplies power, deactivating the charging circuit and the first DC conversion circuit when the AC mains stably supplies power, enabling the charging circuit to charge the rechargeable battery when determining that the power storage capacity of the rechargeable battery is lower than a preset value, and deactivating the charging circuit when determining that the power storage capacity of the rechargeable battery is higher than the preset value.

2. The UPS as claimed in claim 1 further comprising a second DC conversion circuit having:
    a set of input terminals connected to the set of output terminals of the AC to DC power conversion circuit; and
    a set of output terminals outputting DC power having a voltage level different from that of DC power outputted from the set of output terminals of the first DC conversion circuit or the AC to DC power conversion circuit.

* * * * *